United States Patent
Hansen et al.

(10) Patent No.: US 11,528,846 B2
(45) Date of Patent: Dec. 20, 2022

(54) HARVESTER WITH ADJUSTABLE SEPARATOR

(71) Applicant: Deere & Company, Moline, IL (US)

(72) Inventors: Matthew Hansen, Thibodaux, LA (US); Dusk Mixon, Saint Amant, LA (US); John Dighton, Thibodaux, LA (US); Jeffrey Simoneaux, Gonzales, LA (US); Eric Richard, Thibodaux, LA (US); Beau Downey, Gonzales, LA (US); Marcie Words, Moline, IL (US); Andrew Brauning, Thibodaux, LA (US); Blain Cazenave, Vacherie, LA (US)

(73) Assignee: Deere & Company, Moline, IL (US)

( * ) Notice: Subject to any disclaimer, the term of this patent is extended or adjusted under 35 U.S.C. 154(b) by 263 days.

(21) Appl. No.: 16/459,053

(22) Filed: Jul. 1, 2019

(65) Prior Publication Data

US 2020/0137958 A1 May 7, 2020

Related U.S. Application Data

(60) Provisional application No. 62/754,809, filed on Nov. 2, 2018.

(51) Int. Cl.
*A01F 11/00* (2006.01)
*A01D 45/10* (2006.01)

(52) U.S. Cl.
CPC .............. *A01F 11/00* (2013.01); *A01D 45/10* (2013.01)

(58) Field of Classification Search
CPC ........ A01F 11/00; A01F 12/48; A01F 12/444; A01F 29/12; A01D 45/10; A01D 45/00;
(Continued)

(56) References Cited

U.S. PATENT DOCUMENTS 623,109 A * 4/1899 Schuman .............. F04D 23/003
406/99
1,031,472 A * 7/1912 Schubert ................ A01D 47/00
37/260
(Continued)

FOREIGN PATENT DOCUMENTS

CN 103563556 A 2/2014
CN 105359713 A 3/2016
(Continued)

OTHER PUBLICATIONS

Chinese Office Action issued in Chinese Patent Application No. 201910947213.8, dated Aug. 2, 2022, in 10 pages.

*Primary Examiner* — Alicia Torres
*Assistant Examiner* — Madeline I Runco
(74) *Attorney, Agent, or Firm* — Michael Best & Friedrich LLP

(57) ABSTRACT

A harvester includes a main frame supported on a ground surface for transport along the ground surface, an inlet for receiving a crop, and a separator for separating the crop into a first portion and a second portion. The separator includes a hood having an outlet, and a fan operable to generate an airflow through the outlet. The hood of the separator is movable relative to the main frame between a transport position and a harvest position. In the transport position, the hood is positioned at a first height above the ground surface. In the harvest position, the hood is positioned at a second height, greater than the first height, above the ground surface.

18 Claims, 5 Drawing Sheets

(58) Field of Classification Search
CPC .... A01D 41/12; A01D 46/285; A01D 43/087; A01D 43/073; A01D 87/10; A01D 33/02
See application file for complete search history.

(56) References Cited

U.S. PATENT DOCUMENTS

| | | | | |
|---|---|---|---|---|
| 2,092,134 | A * | 9/1937 | Oppenheim | A01F 17/04 406/166 |
| 4,270,337 | A * | 6/1981 | Pinto | A01D 45/10 56/13.9 |
| 4,295,325 | A | 10/1981 | Cannavan | |
| 4,555,896 | A | 12/1985 | Stiff et al. | |
| 5,031,392 | A * | 7/1991 | Baker | A01D 45/10 460/59 |
| 5,092,110 | A | 3/1992 | Dommert et al. | |
| 5,129,219 | A | 7/1992 | Baker | |
| 5,488,820 | A * | 2/1996 | Cannavan | A01D 45/10 56/14.5 |
| 5,558,282 | A * | 9/1996 | Ameye | A01D 43/086 241/101.742 |
| 6,363,700 | B1 * | 4/2002 | Fowler | A01D 45/10 56/13.9 |
| 7,195,557 | B2 * | 3/2007 | Hettiger | A01D 43/087 460/111 |
| 9,084,393 | B1 * | 7/2015 | Singleton | A01D 43/063 |
| 9,456,547 | B2 | 10/2016 | Cazenave et al. | |
| 2004/0053653 | A1 | 3/2004 | Isfort et al. | |
| 2004/0224735 | A1 | 11/2004 | Hinds | |
| 2009/0017885 | A1 * | 1/2009 | Halls | A01F 25/04 460/20 |
| 2012/0110969 | A1 | 5/2012 | Hinds | |
| 2013/0145940 | A1 | 6/2013 | Roberge et al. | |
| 2014/0295923 | A1 | 10/2014 | Vergote | |
| 2015/0327438 | A1 | 11/2015 | Cazenave et al. | |
| 2018/0116114 | A1 * | 5/2018 | Craig | A01D 45/10 |

FOREIGN PATENT DOCUMENTS

| | | | | |
|---|---|---|---|---|
| CN | 105431035 A | | 3/2016 | |
| JP | H10215633 A | | 8/1998 | |
| WO | WO-0032026 A1 * | | 6/2000 | A01D 45/10 |
| WO | 2018037542 A1 | | 3/2018 | |
| WO | WO-2018037543 A1 * | | 3/2018 | A01D 45/10 |

* cited by examiner

HARVESTER WITH ADJUSTABLE SEPARATOR

CROSS-REFERENCE TO RELATED APPLICATIONS

This application claims priority to U.S. Provisional Patent Application No. 62/754,809 filed on Nov. 2, 2018, the entire content of which is incorporated herein by reference.

BACKGROUND

The present disclosure relates to a harvester, such as a sugarcane harvester, and more particularly a separator of a sugarcane harvester.

SUMMARY

In one aspect, the disclosure provides a harvester. The harvester includes a main frame supported on a ground surface for transport along the ground surface, an inlet for receiving a crop, and a separator for separating the crop into a first portion and a second portion. The separator includes a hood having an outlet, and a fan operable to generate an airflow through the outlet. The hood of the separator is movable relative to the main frame between a transport position and a harvest position. In the transport position, the hood is positioned at a first height above the ground surface. In the harvest position, the hood is positioned at a second height, greater than the first height, above the ground surface.

In another aspect the disclosure provides a method of operating a harvester. A hood of a separator of the harvester is positioned in a transport position. The hood is repositioned from the transport position to a harvest position such that the height of the hood above a ground surface is greater than in the transport position. A crop is separated into a first portion and a second portion. A fan coupled to the hood is actuated to move the second portion of the crop into the hood, through the hood, and out to the ground surface through an outlet of the hood.

In yet another aspect, the disclosure provides a separator for removing extraneous plant matter from a harvester. The separator includes a hood having an inlet and an outlet, a fan positioned within the hood and operable to generate an airflow through the outlet, and a cylindrical sleeve nested relative to the hood. The cylindrical sleeve has an inlet and an outlet. The outlet of the cylindrical sleeve provides extraneous plant matter to the inlet of the hood. The hood is movable relative to the cylindrical sleeve between a transport position and a harvest position. In the transport position, the hood is positioned at a first height above the inlet of the cylindrical sleeve. In the harvest position, the hood is positioned at a second height, greater than the first height, above the inlet of the cylindrical sleeve.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
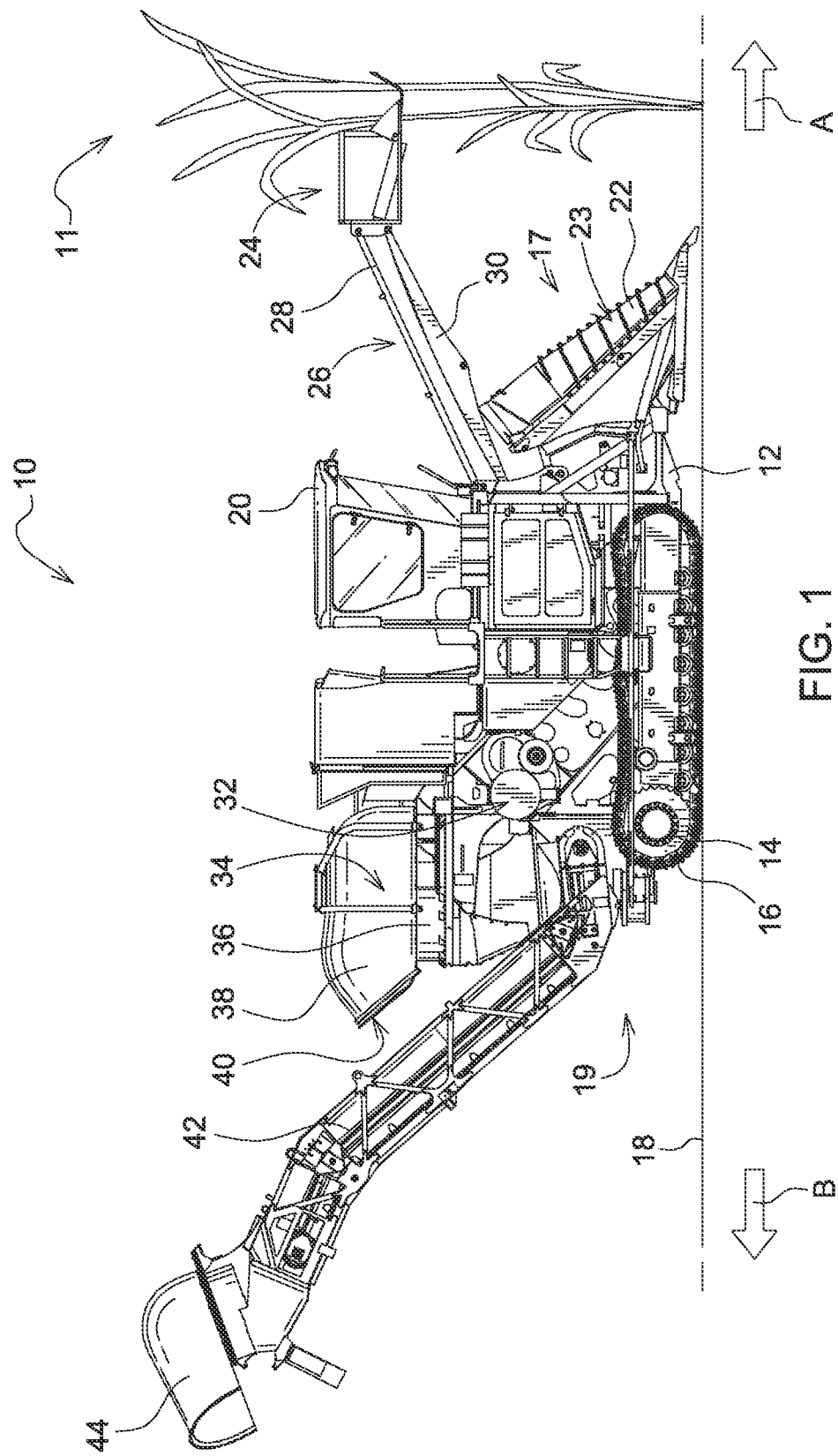
FIG. 1 is a side view of a harvester, such as a sugarcane harvester, in accordance with one implementation of the present disclosure.

FIG. 1 illustrates a harvester 10, such as a sugarcane chopper harvester, including a main frame 12 supported on wheels 14 having continuous tracks 16, tires, or other traction devices that engage a support surface 18 (e.g., the ground or field). The tracks 16 interact directly with the support surface 18 and are responsible for harvester 10 movement and tractive effort in a direction of travel; although in other embodiments the harvester 10 is provided with wheels having tires (rather than tracks as illustrated). During operation, the harvester 10 travels in a forward direction of travel A towards un-cut crop 11 in an un-harvested area of the field 18. A front 17 of the harvester 10 generally faces into the forward direction of travel A, while a rear 19 of the harvester 10 is generally opposite the front 17 and generally faces a rearward direction B, away from the forward direction A, towards a harvested area of the field 18.

An operator's cab 20 is mounted on the frame 12 and contains a seat (not shown) for an operator. A pair of crop lifters 22 having side by side augers or scrolls is mounted to the front 17 of the frame 12 and operate on opposite sides of a row of crop to be harvested. The crop lifters 22 cooperate with a base cutter (not shown) having counter-rotating discs which cut off the stalks of crop close to the support surface 18 (e.g., first portions 13 of the crop). The crop lifters 22 and the base cutter generally define an inlet 23 for receiving the crop into the harvester 10 for processing, as will be described below. A topper 24 extends from the front 17 of the frame 12 on a boom 26. The boom 26 extends forwardly from the front 17 of the frame 12 and includes a first arm 28 and a second arm 30.

The harvester 10 also includes a chopper 32 and a separator 34. The chopper 32 cuts the crop inside the harvester 10, and the separator 34 receives the cut crop from the chopper 32 and generally separates the cut crop.

The chopper 32 may include counter-rotating drum cutters (not shown) with overlapping blades for cutting stalks of crop, such as sugarcane, into billets, which are cut pieces of the stalk. In other constructions, the chopper 32 may include any suitable blade or blades for cutting the stalks of crop. In general, the crop may include sugarcane or any other type of plant, and the cut crop may include billets and extraneous leafy matter. The chopper 32 directs a stream of the cut crop (cut stalks, or billets, along with cut extraneous plant matter) to the separator 34.

The separator 34 is shown in greater detail with respect to FIGS. 2-5. The separator 34 is coupled to the frame 12 and located downstream of the crop lifters 22 and the chopper 32 for receiving cut crop from the chopper 32, may include any combination of one or more of a cleaning chamber 36, a primary extractor fan 46 (FIGS. 2-3) for facilitating separation of the crop (e.g., the leafy matter from the billets), a motor 50 driving the primary extractor fan 46, and a hood 38 for directing and discharging a portion of the separated crop (e.g., extraneous leafy matter) onto the field 18.

The hood 38 has a domed shape, or other suitable shape, and includes an outlet or opening 40 angled out from the harvester 10 and facing slightly down onto the field 18. The hood 38 directs cut crop through the opening 40 to the outside of the harvester 10, e.g., for discharging a portion of cut crop, separated or removed from the stream of cut crop, onto the field.

An elevator 42 is coupled to the frame 12 for receiving cleaned crop from the separator 34. The elevator 42 terminates at a discharge 44 elevated to a height suitable for discharging cleaned crop into a collection receptacle of a vehicle (not shown), such as a truck, wagon, or the like following alongside the harvester 10.

The harvester 10 may also include a controller (not shown) having a user interface for accepting inputs from the operator, e.g., for controlling various machine functions such as operation of the separator 34, the elevator 42, the first and second arms 28, 30 of the boom 26, the topper 24, etc.

FIGS. 2-5 illustrate the separator 34 in accordance with the present disclosure. The separator 34 receives the crop (as shown by arrow C) and separates the crop into a first portion that is saved and discharged into the collection receptacle (as shown by arrow D), as described above, and a second portion that is discarded to the field via the hood 38 (as shown by arrow E). The first portion primarily comprises billets that are harvested for further post-processing (e.g., milling, refining) to produce food products, biofuel, and the like. The second portion primarily comprises extraneous plant matter such as leaves that are discarded to and reincorporated into the field 18.

The separator 34 includes the cleaning chamber 36 located below the hood into which the product is introduced, the hood 38, and a cylindrical sleeve 56 coupled to the hood 38. The sleeve 56 extends axially from a lower end 58A (at or below the hood inlet 40A) to an upper end 58B (at or above the hood inlet 40A). The cylindrical sleeve 56 is hollow having a thickness similar to that of the hood 38 and a diameter similar to the hood 38, though larger than that of the hood 38 by at least the thickness of the sleeve 56 such that the hood 38 nests within the sleeve 56. In other embodiments, the sleeve 56 may be smaller than the hood 38 such that the sleeve 56 nests within the hood 38.

The fan 46 includes fan blades 48, a motor 50, and a hub 52, and is mounted to the hood 38 via a post 54 that extends from the fan 46 to an upper extent of the hood 38. The post 54 is mounted to the hood 38 (e.g., to the body of the hood 38, to a frame of the hood 38, etc.) and extends down into the hood 38 such that the fan 46 is positioned at a height (e.g., a fixed height) relative to the hood 38 (e.g., relative to the hood inlet 40A, relative to the hood outlet 40B). When powered, the motor 50 drives the fan blades 48 to rotate and generate an airflow from the hood inlet 40A and out the hood outlet 40B. A rotational axis 62 of the fan 46 is coaxial with a central axis 62 of the hood 38 and the sleeve 56.

The crop is introduced to the cleaning chamber 36 below the hood 38, where the airflow generated by the fan 48 lifts the lighter, leafy material that is harvested with the billets, and carries it through the hood 38 and to the hood outlet 40B, where it is discarded to the field at an exit angle along an outlet axis 64, offset from the central axis 62 of the hood 38. The height of the fan 46 relative to the chamber 36 affects the strength of the airflow to catch the leafy material and also the billets. If the fan 46 is positioned at a height too far above the chamber 36, the leafy material will not be picked up by the airflow generated by the fan 46 and will instead be collected with the billets in the collection receptacle. If the fan 46 is positioned at a height too near the chamber 36, some or all of the billets will be picked up by the airflow and discarded to the field via the hood 38, resulting in a decreased harvesting efficiency of billets.

Road height restrictions (based on local or federal regulations) limit the overall height (e.g., 16 feet) of vehicles on public roads (without permits), including vehicles such as sugarcane harvesters. Sugarcane harvesters may travel on public roads to reach fields or other locations for fuel or maintenance. In some sugarcane harvesters, the hood defines the highest point of the harvester (especially when the elevator 42 and discharge 44 are in a lowered or stowed position) and is therefore also the limiting factor when determining the overall height of the vehicle.

The hood 38 is located at a height relative to the chamber 36 into which the product is introduced. As the fan 46 is coupled to the hood, the fan 46 is likewise located at a height relative to the chamber into which the product is introduced. By varying the height of the hood, the amount of product that is caught in the airflow generated by the fan 46 is likewise varied. In some sugarcane harvesters, the height of the hood 38 (and the height of the fan 46 attached to the hood 38) is at the maximum height allowable by road height restrictions, yet the fan generates an airflow that carries an undesirably high percentage of billets through the hood outlet and to the field.

Figure 2:
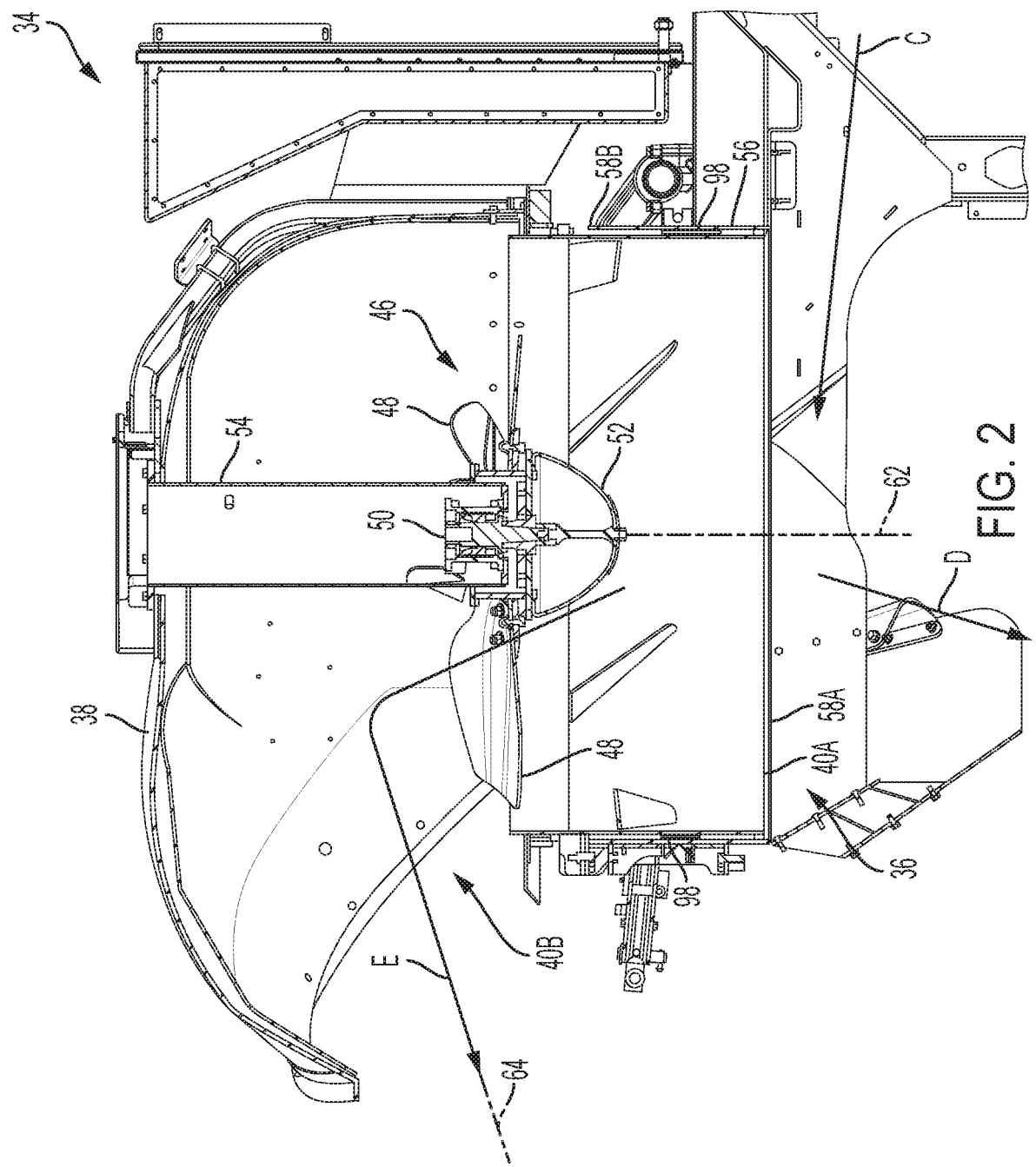
FIG. 2 is a cross-sectional side view of a separator of the sugarcane harvester of FIG. 1, the separator shown in a first position.
Figure 3:
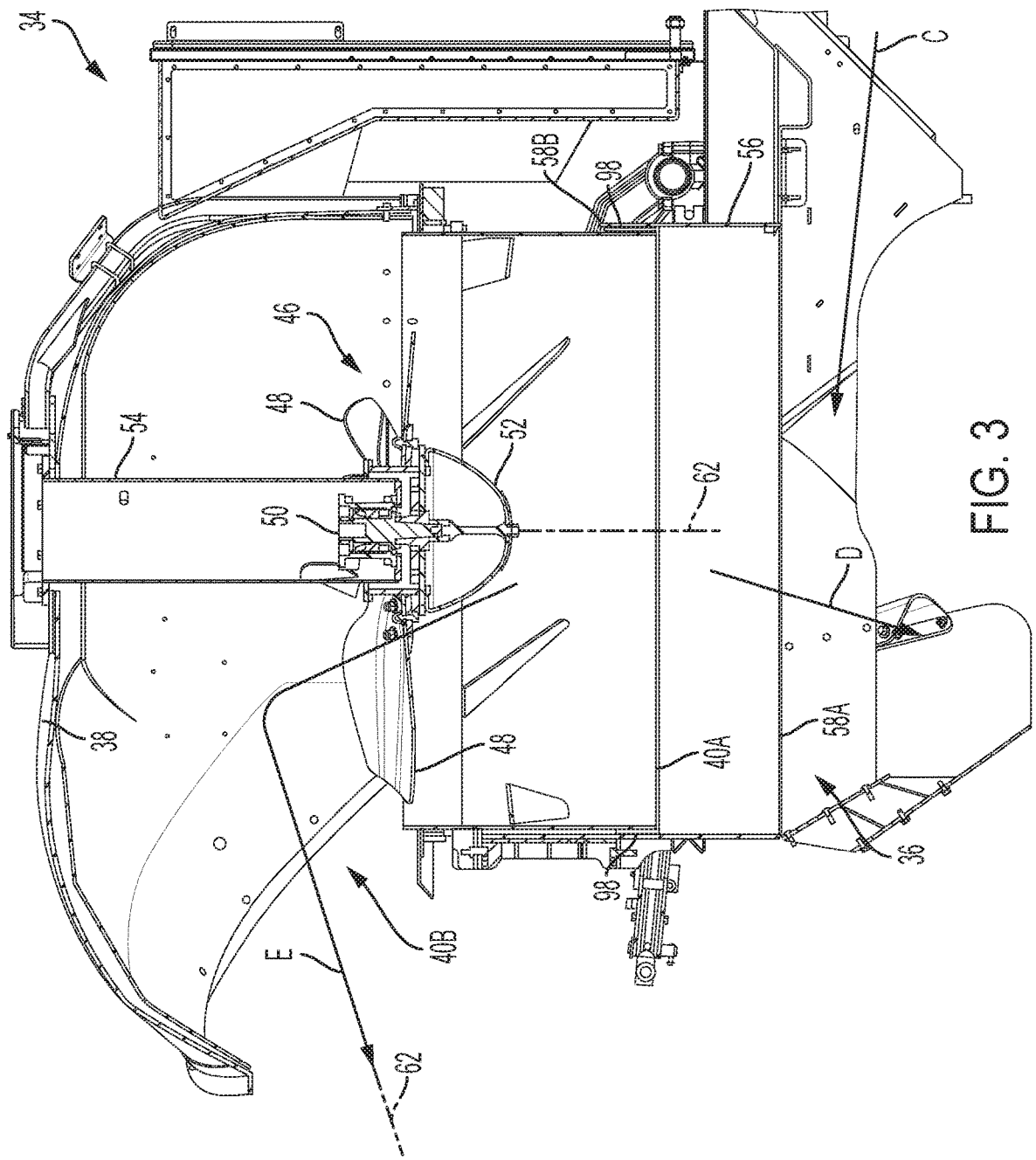
FIG. 3 is a cross-sectional side view of the separator shown in a second position.

As shown in FIGS. 2-3, the hood 38 is adjustable between a first or transport position (FIG. 2) and a second or harvesting position (FIG. 3). In the transport position, the height of the top of the hood 38 is at or below the road height restriction. In transport, the harvester 10 is not harvesting and the fan 46 is not functioning, so there is no loss based on the lowered height of the hood 38 and fan 46. In the harvest position, the height of the top of the hood 38 is above the road height restriction to improve the loss efficiency of the separator 34. Testing has shown that increasing the height of the hood 38 and fan 46 above the road height restriction (e.g., by 10-14 inches) results in an 80% reduction in billet losses to the field (in tons/acre) without significantly increasing the overall amount of leafy material introduced into the collection receptacle.

Figure 4:
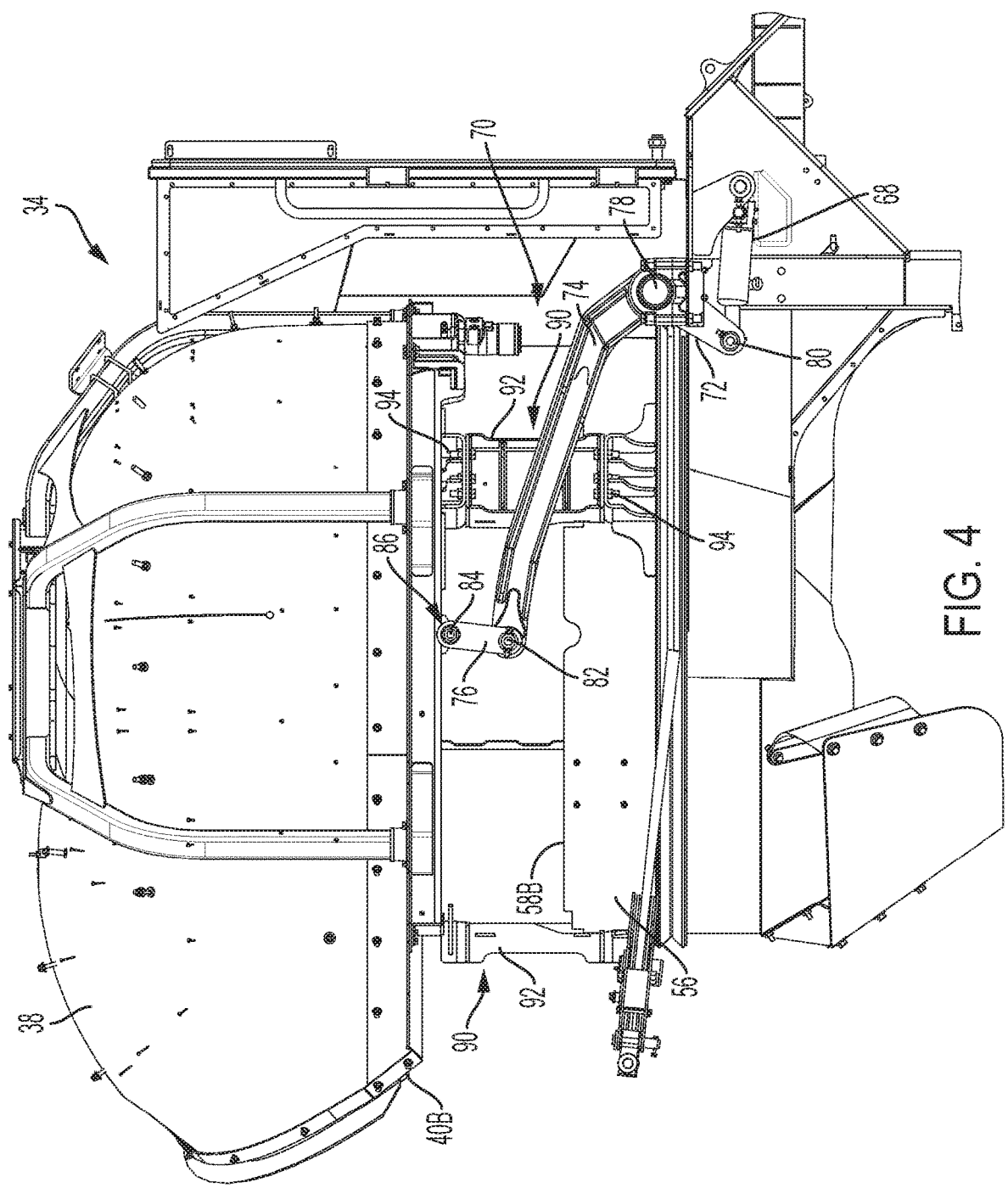
FIG. 4 is a side view of the separator shown in the second position.
Figure 5:
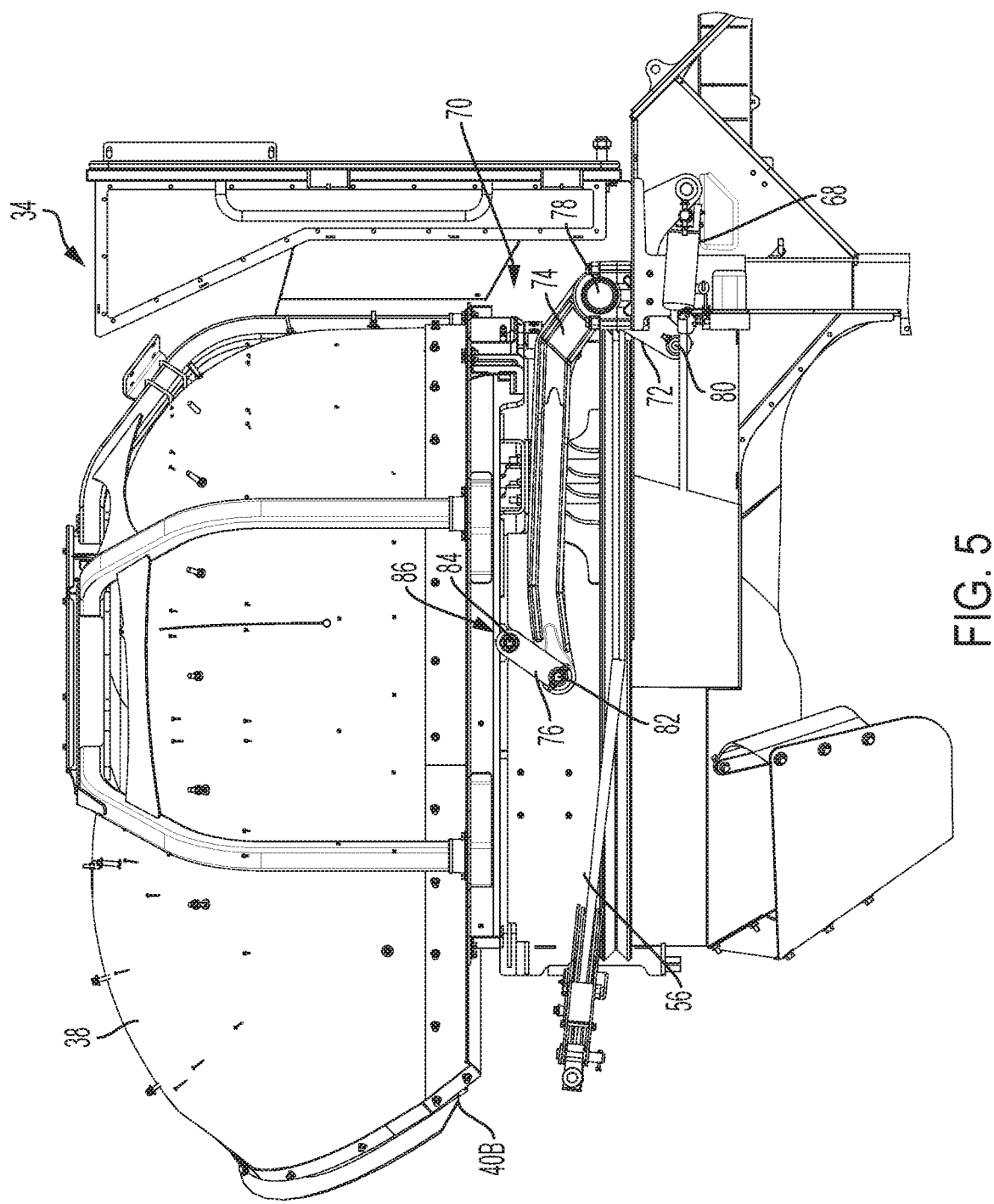
FIG. 5 is a side view of the separator shown in the first position.

As shown in FIGS. 4-5, a linear actuator 68 (e.g., a hydraulic actuator) and a linkage assembly 70 are utilized to move the hood 38 from the transport position (FIG. 5) to the harvest position (FIG. 4). The linear actuator 68 is mounted to the frame 12 of the harvester 10 and includes an extensible rod that extends relative to the frame 12. A first linkage 72 of a linkage assembly 70 is fastened to the extensible rod of the linear actuator 68 at a first pin 80 defining a first rotational axis. A second end of the first linkage 72 is fixed to and co-rotatable with a rotatable rod 78. The rotatable rod is coupled to and rotatable relative to the frame 12. Therefore, when the linear actuator 68 is actuated, the first linkage 72 rotates, thereby rotating the rotatable rod 78 about its own axis. A second linkage 74 of the linkage assembly 70 is fixed to and co-rotatable with the rotatable rod 78 at a first end. The second linkage 74 includes three linear sections angled relative to one another between the first end and a second end. A third linkage 76 is attached at a first end to the second end of the second linkage 74 via a second pin 82. A second end of the third linkage 76 is attached to the hood 38 via a pin 84 at an attachment point 86. The third linkage 76 is therefore rotatable relative to the second linkage 74 about the second pin 82 and rotatable relative to the hood 38 about the third pin 84.

The rotatable rod 78 may support multiple linkage assemblies 70 such that the hood 38 includes multiple attachment points 86, each attachment point 86 attached to one of the multiple linkage assemblies 70. Though not shown, a second linkage assembly 70 (similar to the one shown in FIGS. 4-5) is positioned on the opposite side of the hood 38 for attaching to an attachment point that is diametrically opposed from the attachment point shown in FIGS. 4-5. The second linkage assembly includes second and third linkages (similar to the second and third linkages 74, 76) attached to the rotatable rod 78, and may optionally include a second linear actuator and first linkage (similar to the first linkage 72) for rotating the rotatable rod 78.

The linear actuator 78 may be manually actuated (e.g., by an operator located adjacent the linear actuator). Alternatively, the linear actuator may be automatically actuated either by an operator input, or by a sensed condition, such as the ground surface, the vehicle speed, or activation of other harvesting elements such as the fan 46, the chopper 32, or the crop lifters 22.

Guide blocks 98 made of low-friction material may be positioned circumferentially between the hood 38 and the sleeve 56 such adjustment of the hood 38 relative to the sleeve 56 is linear translation with limited radial play. The guide blocks 98 may be individual blocks 98 spaced apart from one another or may otherwise be a continuous ring extending about the circumference of the hood 38. In other embodiments, the guide blocks 98 may be omitted if the radial clearance between the hood 38 and the sleeve 56 is minimized.

A holding system 90 may be utilized to hold the hood 38 in the raised harvest position such that the linear actuator 68 does not need to remain energized when in the harvest position. As shown in FIG. 4, the holding system 90 includes holding blocks 92 positioned between opposing pedestals on the hood 38 and the sleeve 56. The holding blocks 92 are fastened to the hood 38 and the sleeve 56 via fasteners 94. Without the holding blocks 92, the opposing pedestals contact one another in the transport position, as shown in FIG. 5. In other embodiments, the holding system 90 may include different locking arrangements including, for example, bolts extending through aligned holes in the hood 38 and the sleeve 56, snap features, or other threaded bolt or pin arrangements.

In operation, to transition the separator 34 from the transport position to the harvest position, the operator actuates the linear actuator 68. The linear actuator 68 drives the first linkage 72 to rotate the rotatable rod 78. Rotation of the rotatable rod 78 relative to the frame 12 likewise rotates the second linkage 74, lifting the distal second end of the second linkage 74. The third linkage 76 is likewise raised and, via a pin connection to the hood 38 and the second linkage 74, permits linear vertical translation of the hood 38 along the central axis 62 relative to the frame 12, the cylindrical sleeve 56, and the ground 18. Once in the harvest position, the holding blocks 92 of the holding system 90 are positioned between opposing pedestals of the hood 38 and sleeve 56 and are fastened into place. The linear actuator 68 is then deactivated with the hood locked in the harvest position. Once in the harvest position, the fan 46 is activated to generate the airflow to pick up a first portion of the harvested crop (the extraneous plant matter), allowing the heavier billets to fall to the elevator 42 and discharge 44.

In the harvest position, the opening 40A of the hood 38 is above the lower end 58A of the cylindrical sleeve 56 but is below the upper end 58B of the cylindrical sleeve. This arrangement limits any gaps and inefficiencies in the airflow generated by the fan 46 within the hood 38.

In operation, to transition the separator 34 from the harvest position to the transport position, the operator removes the holding blocks 92 from between the pedestals of the hood 38 and sleeve 56. The weight of the hood 38 allows the hood 38 to axially translate along the central axis 62 until it rests in the lowered transport position. In some embodiments, the operator may lock the hood 38 relative to the sleeve 56 or the frame 12 in the transport position, until it is desired to transition the separator 34 to the transport position once again.

Thus, the disclosure provides, among other things, a harvester having a multi-row topper. Various features and advantages of the disclosure are set forth in the following claims.

What is claimed is:

1. A harvester comprising:
a main frame supported on a ground surface for transport along the ground surface;
an inlet for receiving a crop;
a separator for separating the crop into a first portion and a second portion, the separator comprising a hood having an outlet, and a fan operable to generate an airflow through the outlet to separate the crop; and
an elevator coupled to the main frame and configured to receive the first portion of the crop from the separator, the elevator terminating at a discharge for discharging the first portion of the crop from the harvester;
wherein the hood of the separator is movable relative to the main frame between a transport position and a harvest position,
wherein, in the transport position, the hood is positioned at a first height above the ground surface,
wherein, in the harvest position, the hood is positioned at a second height, greater than the first height, above the ground surface, and
wherein the fan is fastened to the hood such that movement of the hood between the transport position and the harvest position results in movement of the fan,
wherein the hood is configured to translate between the transport position and the harvest position.

2. The harvester of claim 1, wherein the first portion comprises billets to be harvested, and the second portion comprises extraneous plant matter to be discarded.

3. The harvester of claim 1, wherein the separator includes a cylindrical sleeve, the hood being slidable along the cylindrical sleeve between the transport position and the harvest position.

4. The harvester of claim 3, wherein the cylindrical sleeve includes a central axis oriented substantially vertically and the outlet of the hood is offset from the central axis.

5. The harvester of claim 3, wherein one of the cylindrical sleeve and the hood is nested within the other of the cylindrical sleeve and the hood.

6. The harvester of claim 1, further comprising a linear actuator operable to move the hood from the transport position to the harvest position.

7. The harvester of claim 6, further comprising a linkage assembly having at least two linkages fastened to and rotatable relative to one another, and coupled to the linear actuator and the hood, wherein the linear actuator is operable to rotate the linkage assembly to move the hood from the transport position to the harvest position.

8. The harvester of claim 1, further comprising a holding system fastened to the hood and operable to hold the hood in the harvest position.

9. The harvester of claim 1, further comprising guide blocks positioned between the hood and a cylindrical sleeve to facilitate translation between the transport position and the harvest position.

10. The harvester of claim 1, wherein, when in the transport position, the fan is positioned at a first height about the ground surface, and wherein, in the harvest position, the fan is positioned at a second height, greater than the first height, above the ground surface.

11. The harvester of claim 10, wherein the separator includes a cleaning chamber positioned below the hood, wherein a height of the cleaning chamber relative to the ground surface is not varied when the hood transitions between the transport and harvest positions.

12. A method of operating a harvester, the method comprising:
    positioning a hood of a separator of the harvester in a transport position;
    repositioning the hood and a fan coupled to the hood from the transport position to a harvest position such that the height of the hood and the fan above a ground surface is greater than in the transport position;
    actuating the fan to separate a crop into a first portion and a second portion, the fan being coupled to the hood to move the second portion of the crop into the hood, through the hood, and out to the ground surface through an outlet of the hood, and
    after separating the crop into the first portion and the second portion, providing the first portion from an outlet of the separator to an elevator of the harvester,
    wherein repositioning the hood further comprises axially translating the hood along a nested sleeve.

13. The method of claim 12, wherein repositioning the hood further comprises sliding the hood along guide blocks positioned between the hood and the sleeve.

14. The method of claim 12, wherein repositioning the hood further comprises activating a linear actuator to drive the sleeve from the transport position to the harvest position.

15. The method of claim 14, further comprising locking the hood in the harvest position and deactivating the linear actuator.

16. A separator for removing extraneous plant matter from a harvester, the separator comprising:
    a hood having an inlet and an outlet;
    a fan positioned within the hood and operable to generate an airflow through the outlet to separate a crop into extraneous plant matter and a cleaned crop; and
    a cylindrical sleeve nested relative to the hood, the cylindrical sleeve having an inlet and an outlet, wherein the outlet of the cylindrical sleeve provides the extraneous plant matter to the inlet of the hood, and
    a separator outlet distinct from the outlet of the hood and configured to provide a cleaned crop from the separator to an elevator of the harvester;
    wherein the hood is configured to translate relative to the cylindrical sleeve between a transport position and a harvest position,
    wherein, in the transport position, the hood is positioned at a first height above the inlet of the cylindrical sleeve, and
    wherein, in the harvest position, the hood is positioned at a second height, greater than the first height, above the inlet of the cylindrical sleeve.

17. The separator of claim 16, further comprising a linear actuator operable to move the hood from the transport position to the harvest position, and a linkage assembly having at least two linkages fastened to and rotatable relative to one another, and coupled to the linear actuator and the hood, wherein the linear actuator is operable to rotate the linkage assembly to move the hood from the transport position to the harvest position.

18. The separator of claim 16, further comprising a holding system fastened to the hood and operable to hold the hood in the harvest position.

* * * * *